United States Patent
Jonsson et al.

(10) Patent No.: US 8,520,782 B2
(45) Date of Patent: Aug. 27, 2013

(54) RECEIVER POWER REDUCTION METHODS AND APPARATUS

(75) Inventors: Elias Jonsson, Malmö (SE); Göran Bergman, Lund (SE); Srikanth Gopal, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 293 days.

(21) Appl. No.: 12/971,021

(22) Filed: Dec. 17, 2010

(65) Prior Publication Data

US 2012/0155576 A1    Jun. 21, 2012

(51) Int. Cl.
*H01L 27/06* (2006.01)

(52) U.S. Cl.
USPC .......................................................... 375/340

(58) Field of Classification Search
USPC .................. 375/340, 326, 346, 343
See application file for complete search history.

(56) References Cited

U.S. PATENT DOCUMENTS

| | | | |
|---|---|---|---|
| 5,305,349 A | 4/1994 | Dent | |
| 6,363,104 B1 | 3/2002 | Bottomley | |
| 6,801,565 B1 | 10/2004 | Bottomley et al. | |
| 7,555,074 B2 | 6/2009 | Lindoff et al. | |
| 7,593,378 B1 * | 9/2009 | Murali et al. | 370/338 |
| 8,315,339 B2 * | 11/2012 | Rosenqvist et al. | 375/326 |
| 2001/0028677 A1 | 10/2001 | Wang et al. | |
| 2003/0058820 A1 | 3/2003 | Spencer et al. | |
| 2004/0240531 A1 | 12/2004 | Black et al. | |
| 2005/0002444 A1 | 1/2005 | Wei et al. | |
| 2005/0105647 A1 | 5/2005 | Wilhelmsson et al. | |
| 2006/0171449 A1 | 8/2006 | Lindoff et al. | |
| 2006/0234755 A1 * | 10/2006 | Jonsson et al. | 455/525 |
| 2007/0191048 A1 * | 8/2007 | Catreux-Erceg et al. | 455/522 |
| 2008/0049816 A1 * | 2/2008 | Nakajima | 375/148 |
| 2008/0107215 A1 * | 5/2008 | Nibe | 375/346 |
| 2008/0310485 A1 | 12/2008 | Soliman et al. | |
| 2009/0052584 A1 * | 2/2009 | Cairns | 375/340 |
| 2009/0059871 A1 | 3/2009 | Nader et al. | |
| 2009/0122926 A1 * | 5/2009 | Azenkot et al. | 375/343 |
| 2011/0039507 A1 * | 2/2011 | Sato | 455/226.2 |
| 2012/0192020 A1 * | 7/2012 | Kreuchauf et al. | 714/704 |

FOREIGN PATENT DOCUMENTS

| | | |
|---|---|---|
| EP | 1 843 492 A1 | 10/2007 |
| GB | 2 415 330 B | 7/2006 |

OTHER PUBLICATIONS

PCT International Search Report, mailed Mar. 6, 2012, in connection with International Application No. PCT/EP2011/071897.

3GPP TS 23.041, V10.0.0 Technical Specification Group Core Network and Terminals; Technical realization of Cell Broadcast Service (CBS) (Release 10), Sep. 2010.

3GPP TR 25.925, V3.5.0 Technical Specification Group Radio Access Network; Radio interface for broadcast/multicast services (Release 1999), Dec. 2004 Version???

3GPP TS 25.211, V10.0.0 Technical Specification Group Access Network; Physical channels and mapping of transport channels onto physical channels (FDD) (Release 10), Sep. 2010.

(Continued)

*Primary Examiner* — Jaison Joseph

(74) *Attorney, Agent, or Firm* — Potomac Patent Group PLLC

(57) ABSTRACT

Methods and apparatus for controlling a receiver based on a received signal include receiving the signal; generating, based on a portion of the signal, a SIR estimate; comparing the SIR estimate and a threshold value; and demodulating a remaining portion of the signal only if the SIR estimate passes the threshold value.

18 Claims, 5 Drawing Sheets

(56) References Cited

OTHER PUBLICATIONS

3GPP Ts 23.401, V10.1.0 Technical Specification Group Services and System Aspects; General Packet Radio Service (GPRS) enhancements for Evolved Universal Terrestrial Radio Access Network (E-UTRAN) access (Release 10), Sep. 2010.

3GPP TS 25.324, V3.1.0 Technical Specification Group Radio Access Network; Radio Interface for Broadcast/Multicast Services (Release 1999), Mar. 2000.

* cited by examiner

RECEIVER POWER REDUCTION METHODS AND APPARATUS

TECHNICAL FIELD

This application relates to electronic digital communication systems and more particularly to receivers in cellular radio communication systems.

BACKGROUND

Digital communication systems include time-division multiple access (TDMA) systems, such as cellular radio communication systems that comply with the GSM telecommunication standard and its enhancements like GSM/EDGE, and code-division multiple access (CDMA) systems, such as cellular radio communication systems that comply with the cdma2000 and wideband CDMA (WCDMA) telecommunication standards. WCDMA is based on direct-sequence spread-spectrum techniques, with pseudo-noise scrambling codes and orthogonal channelization codes separating base stations and physical channels (terminals or users), respectively, in the downlink (base-to-terminal) direction. Digital communication systems also include "blended" TDMA and CDMA systems, such as cellular radio communication systems that comply with the universal mobile telecommunications system (UMTS) standard, which specifies a third generation (3G) mobile system developed by the European Telecommunications Standards Institute (ETSI) within the International Telecommunication Union's (ITU's) IMT-2000 framework. The Third Generation Partnership Project (3GPP) promulgates the UMTS and WCDMA standards.

In WCDMA cellular radio communication systems, 3GPP specifies a cell broadcast short message service (CBS), which enables transmission of unacknowledged messages to all receivers in user equipments (UEs), such as mobile phones, within a cell broadcast area, which can include one or more cells or a geographic area. The duration of a cell broadcast, which is carried by a secondary common control physical channel (S-CCPCH), depends on the type of information broadcast and the information provider. Examples of CBS information are weather information, emergency information, warnings (e.g., of natural disasters), and news reports. CBS messages are cyclically broadcast on a frequency and for a duration agreed with the information provider.

CBS is specified in, for example, 3GPP Technical Specification (TS) 23.041 V10.0.0, Technical Realization of Cell Broadcast Service (CBS) (Release 10) (September 2010), and 3GPP Technical Report (TR) 25.925 V3.5.0, Radio Interface for Broadcast/Multicast Services (Release 99) (December 2004). According to 3GPP TR 25.925, a cell indicates its schedule of CBS messages by higher-layer (i.e., Layers 2 and 3) scheduling. See, e.g., subclauses 6.3.2.2 and 6.3.6.4 of 3GPP TR 25.925.

Various channels, including a primary common control physical channel (P-CCPCH) and the S-CCPCH, between base stations and UEs in a WCDMA system carry physical-layer control signaling (e.g., pilot symbols/signals, transmission power commands, etc.). Clause 6.1 of 3GPP TS 25.211 V10.0.0, Physical Channels and Mapping of Transport Channels onto Physical Channels (FDD) (Release 10) (September 2009) describes the mapping of transport channels on physical channels in a WCDMA communication system. Table 4.1 of 3GPP TR 25.925 indicates that CBS information is carried by the S-CCPCH. It will be appreciated that other communication systems have corresponding channels. Scrambling and channelization codes are well known in the art.

A UE can discover that there is a CBS message available only after the UE demodulates and decodes a paging indicator channel (PICH) that, among other things, indicates to the UE that there may be a CBS message on the S-CCPCH. The UE must demodulate and decode the PICH during every period that the UE has "woken up" its receiver (in a UE's discontinuous reception (DRX) mode of operation) and then demodulate and decode all of the S-CCPCH information in order for the UE to determine if a CBS message is present in the S-CCPCH information.

Demodulation and decoding are processes that require energy, which can be in limited supply in a portable UE like a mobile phone. U.S. Patent Application Publication No. US 2008/0310485 A1 by Soliman et al. (2008 Dec. 18) describes a computer-implemented method that includes identifying available receiver resources and dynamically disabling or enabling subsets of resources based on at least a channel estimation. A signal to interference ratio (SIR), block error rate (BLER), delay spread, and received signal strength indication (RSSI) can also be measured for selecting a number of equalizer fingers, a number of used analog to digital converter bits, and path-searcher monitoring fingers to save power.

European Patent Publication EP 1843492 A1 by Iizuka et al. (2007 Oct. 10) discloses saving power by operating a multi-path interference removing apparatus in a receiver only in a limited number of receiver states, including where the SIR power ration is 8 dB or more.

SUMMARY

In order to reduce a receiver's power consumption in accordance with this invention, the receiver determines whether to continue to demodulate a received signal or a channel, such as a S-CCPCH, based on an estimate of the SIR of the S-CCPCH or another parameter that is related to the likelihood that a CBS message is present (or not) in the S-CCPCH. Hence, the receiver can stop demodulating the S-CCPCH when the parameter indicates that there is no CBS message. In this case, a further determination can be made that decoding the S-CCPCH is not needed.

In accordance with aspects of this invention, there is provided a method of controlling a receiver based on a received signal that includes demodulating a first portion of the received signal; generating, based on a demodulated first portion of the signal, an estimate of signal to interference ratio (SIR); comparing the SIR estimate and a threshold value; and at least demodulating a second portion of the signal only if the SIR estimate passes the threshold value.

Also in accordance with aspects of this invention, there is provided an apparatus in a receiver for controlling the receiver based on a received signal. The apparatus includes a demodulator configured to demodulate at least a first portion of the received signal; an estimator configured to generate, based on a demodulated first portion of the received signal, a signal-to-interference ratio (SIR) estimate; and a comparator configured to compare the SIR estimate and a threshold value. The demodulator is further configured to demodulate a second portion of the received signal only if the SIR estimate passes the threshold value.

Also in accordance with aspects of this invention, there is provided a computer-readable medium having stored instructions that, when executed by a computer, cause the computer to carry out a method of controlling a receiver based on a received signal. The method includes demodulating a first portion of the received signal; generating, based on a demodulated first portion of the received signal, an estimate of signal to interference ratio (SIR); comparing the SIR estimate and a threshold value; and at least demodulating a second portion of the signal only if the SIR estimate passes the threshold value.

BRIEF DESCRIPTION OF THE DRAWINGS

The various objects, features, and advantages of this invention will be apparent from reading this description in conjunction with the drawings, in which.

DETAILED DESCRIPTION

Demodulating and decoding a received signal or a channel, such as the S-CCPCH, when there is no relevant information present, such as a CBS message, unnecessarily increases the power consumption of a receiver. The PICH, for example, indicates that there may be a CBS message in the information carried by the S-CCPCH, but often there is no CBS message. In accordance with various embodiments of this invention, a receiver can reduce its power consumption by determining whether to continue to demodulate a S-CCPCH based on an estimate of the SIR of the S-CCPCH or of another parameter that is related to the likelihood that a CBS message is present (or not) in the S-CCPCH. The receiver can stop demodulating the S-CCPCH before completing demodulation, completely avoid decoding the S-CCPCH, and save power when the parameter estimate indicates that there is no CBS message.

Among other things, this application describes methods and apparatus for determining the SIR of a communication channel as a basis for deciding whether demodulation and decoding are necessary. One advantageous way to determine a SIR is to use the decoder hardware in a UE, such as a mobile telephone or other receiver, to decode received blocks of information. In a typical WCDMA receiver, such decoder hardware can be a Turbo decoder or a convolutional decoder that can be implemented by, for example, a suitably programmed processor circuit, an application-specific integrated circuit (ASIC), or a combination of them. Moreover, it will be understood that the SIR is used in this application for simplicity of explanation, and thus the term "SIR" will be understood to include also other signal measures, such as the signal to noise ratio (SNR).

This application also focusses on WCDMA systems for simplicity, but it will be understood that the principles described in this application can be implemented in other digital communication systems. For example, the CBS per se is not currently specified for Long Term Evolution (LTE) cellular radio communication systems (generally 3GPP Release 8 and later), but a warning-message delivery service is specified that is similar to the CBS, with interface requirements specified in, for example, Clause 5.12 of 3GPP TS 23.401 V10.1.0, General Packet Radio Service (GPRS) Enhancements for Evolved Universal Terrestrial Access Network (UTRAN) Access (Release 10) (September 2010).

Figure 1:
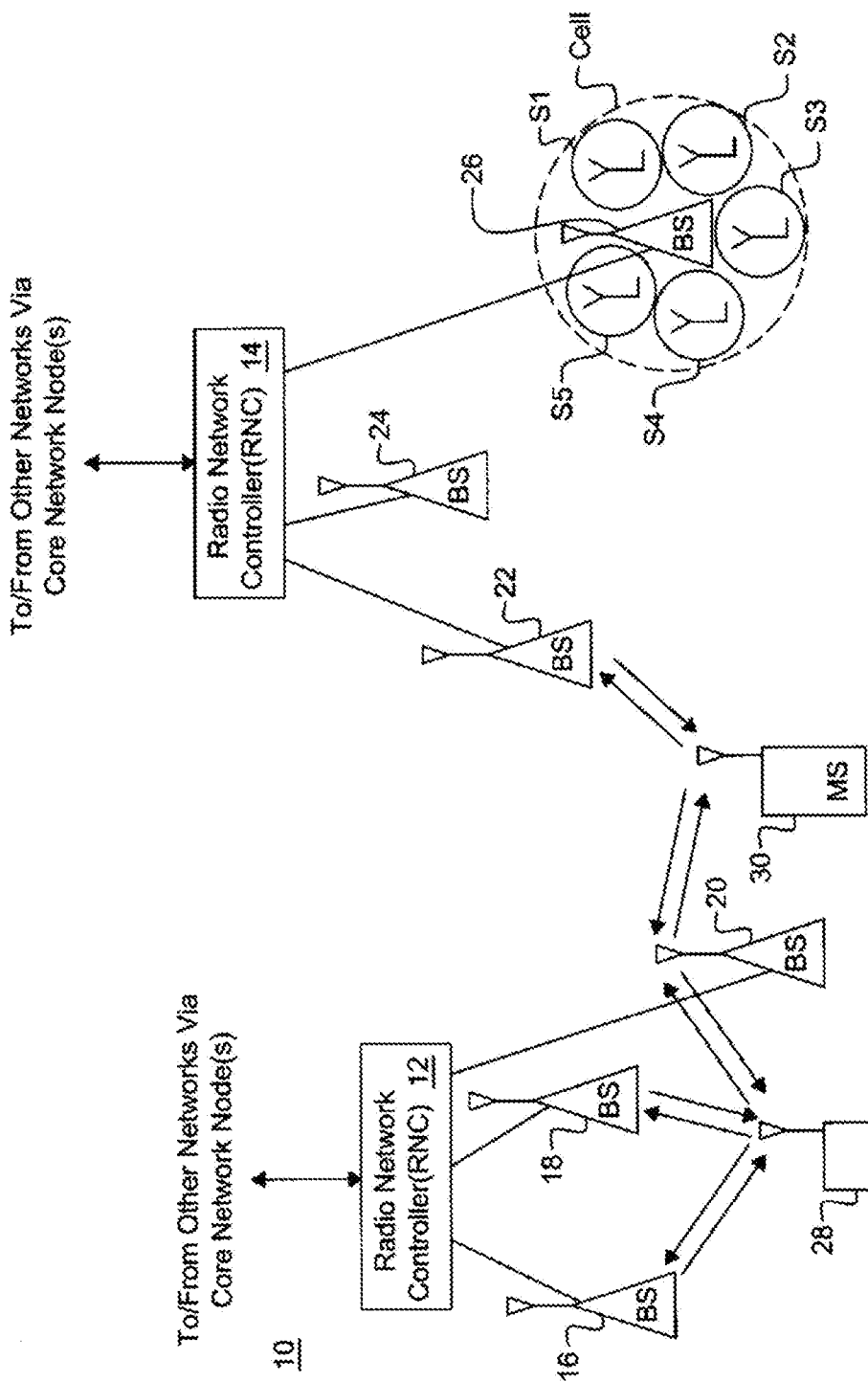
FIG. 1 depicts a cellular radio communication system.

FIG. 1 depicts a typical cellular communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. In FIG. 1, RNC 12 is shown coupled to BSs 16, 18, 20, and RNC 14 is shown coupled to BSs 22, 24, 26.

Each BS or NodeB, or evolved NodeB in an LTE system, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It will be understood that the arrangement of functionalities depicted in FIG. 1 can be modified in LTE and other communication systems. For example, the functionality of the RNCs 12, 14 can be moved to eNodeBs 22, 24, 26, and other functionalities can be moved to other nodes in the network. It will also be understood that a base station can use multiple transmit antennas to transmit information into a cell/sector/area, and those different transmit antennas can send respective, different pilot signals.

In a communication system such as that depicted by FIG. 1, a BS transmits predetermined pilot symbols on a physical common pilot channel (CPICH), and a UE typically uses the CPICH pilot symbols in estimating the impulse response of the radio channel to the BS. The BS also transmits predetermined pilot signals on other downlink physical channels (DPCHs) to the UE, and the UE uses the DPCH pilots mainly for SIR estimation. It will be understood that the UE uses the CPICH pilots for channel estimation due to the CPICH's typically higher SNR.

Figure 2A:
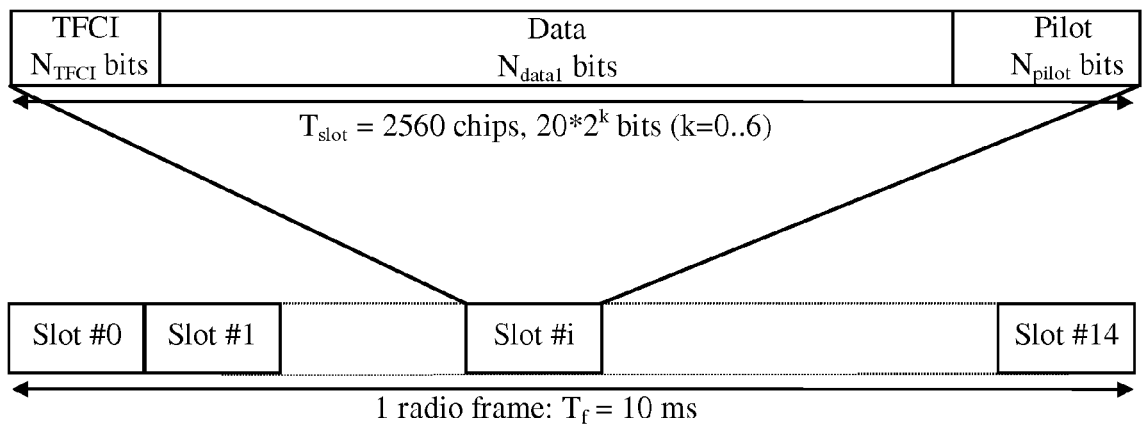
FIG. 2A depicts a frame structure of a secondary common control physical channel.

FIG. 2A illustrates the frame structure of an S-CCPCH in accordance with Subclause 5.3.3.4 of 3GPP TS 25.211. The S-CCPCH and other physical channel signals are generally organized in successions of radio frames of duration 10 milliseconds (ms), and each radio frame is divided into 15 time slots, each having 2560 chips. In general, one type of S-CCPCH includes a transport format combination indicator (TFCI) that has a number $N_{TFCI}$ of bits in each slot and the other type does not. The BS and RNC determine whether a TFCI is included. Each slot also includes a pilot that has a number $N_{pilot}$ of bits, with the rest of the slot allocable to data. A parameter k determines the total number of bits per S-CCPCH slot and is related to the spreading factor (SF) of the physical channel as SF=256/2 k.

Figure 2B:
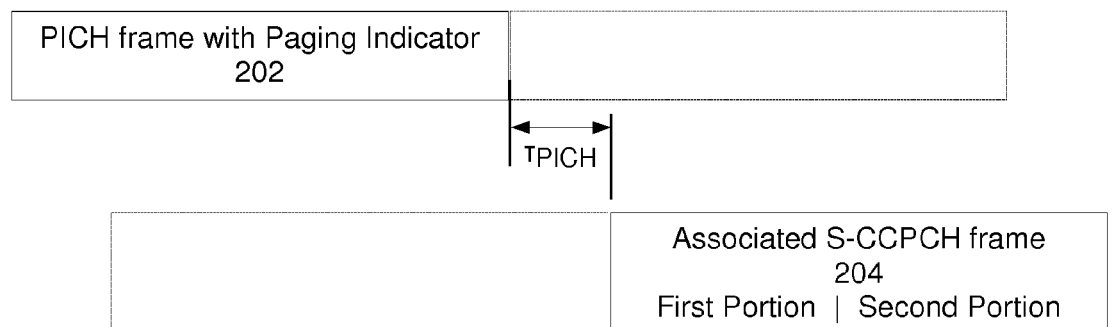
FIG. 2B depicts a timing between frames of a paging indicator channel and a secondary common control physical channel.

FIG. 2B illustrates the timing between a PICH frame 202 and its associated single S-CCPCH frame 204, i.e., the S-CCPCH frame that carries the paging information related to the paging indicator(s) in the PICH frame. A successive PICH frame and a preceding S-CCPCH frame are indicated by dashed lines in FIG. 2B. As specified by subclause 5.3.3.10 of 3GPP TS 25.211, the PICH is a fixed-rate physical channel with SF=256 that is used to carry the paging indicators and can be associated with an S-CCPCH to which a paging channel (PCH) transport channel is mapped. A paging indicator set in a PICH frame means that the paging message is transmitted in the S-CCPCH frame starting $T_{PICH}$=7680 chips after the transmitted PICH frame.

As described above, the PICH notifies a UE that there may be information for the UE on the S-CCPCH, which the UE needs to demodulate and decode with the timing shown in FIG. 2B. Thus, the S-CCPCH frame 204 as shown in FIG. 2B can be considered as having a first portion and a second portion. CBS messages carried by the S-CCPCH typically extend over several slots. Table 4.1 in 3GPP TR 25.925 V3.5.0 shows the link between the channels (logical, transport and physical) used to enable CBS, and details in relation to UE DRX are specified in subclause 6.3.6.4.

Figure 3A:
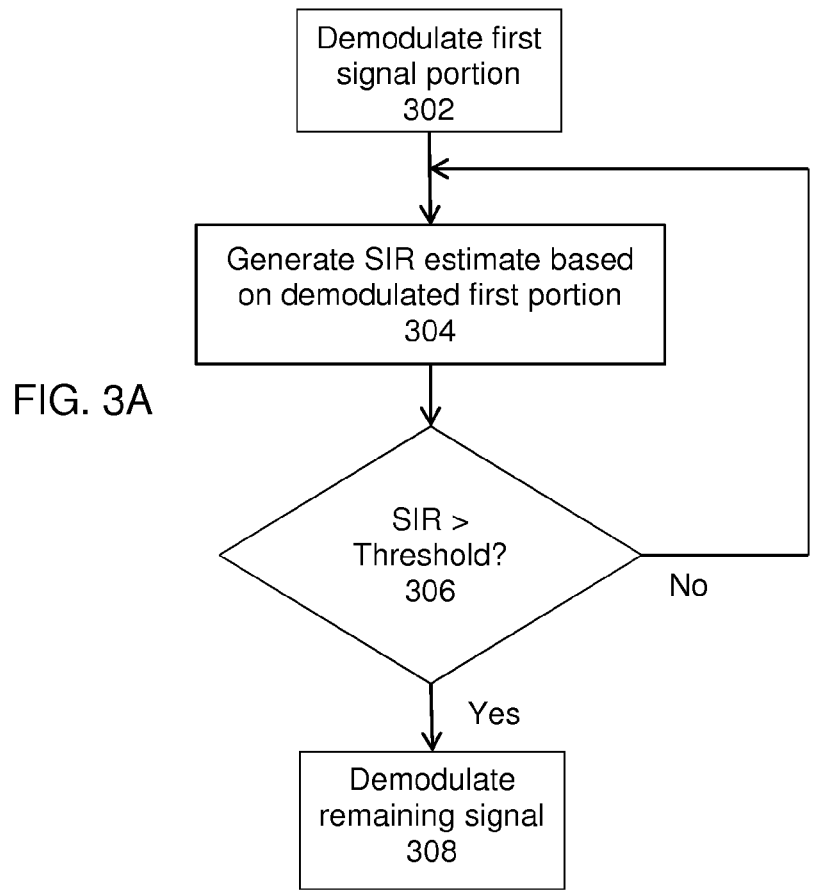
FIGS. 3A, 3B are flow charts of methods of controlling a signal receiver based on a signal received.
Figure 3B:
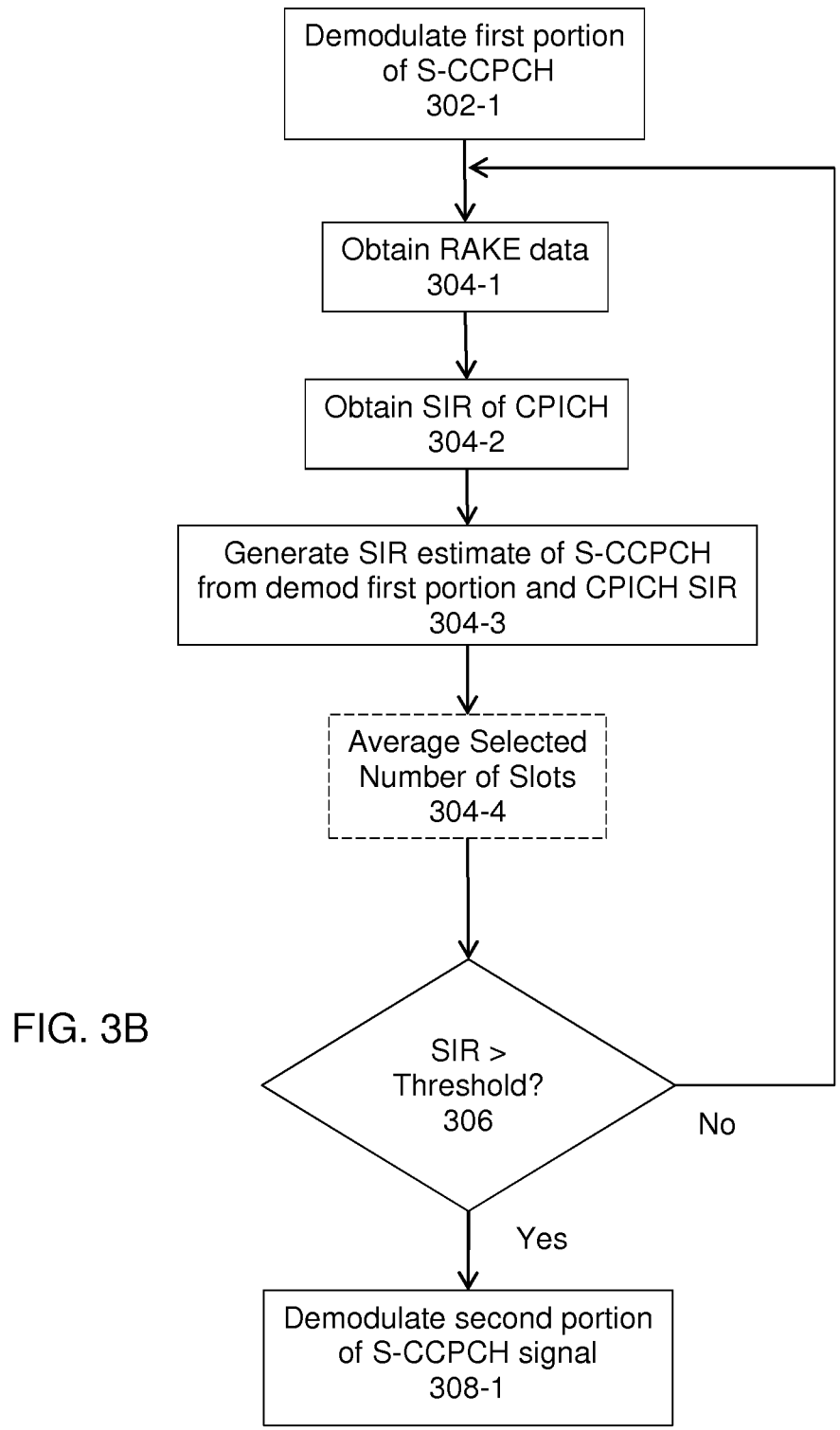

In order to reduce a receiver's power consumption, the receiver bases a decision to demodulate and decode the S-CCPCH on an estimate of the SIR or similar parameter of the S-CCPCH. FIGS. 3A, 3B are flow charts of methods of controlling a signal receiver based on a signal received. FIG. 3A illustrates an example of a general method, and FIG. 3B illustrates an example of a method for the S-CCPCH. The methods can be implemented by suitable programming in a UE or other receiver.

The example of a general method depicted by FIG. 3A includes demodulating (step 302) a selected first portion of a received a signal, and generating (step 304) a SIR estimate based on the demodulated first portion of the received signal. The method further includes comparing (step 306) the SIR estimate and a threshold value, and at least demodulating (step 308) a remaining portion of the received signal only if the SIR estimate passes the threshold value (Yes in step 306). If the SIR estimate does not pass the threshold value (No in step 306), the method returns to generating a SIR estimate (step 304) and the received signal is not further demodulated and not decoded at all, thereby saving the receiver's energy and potentially freeing receiver components for other tasks.

It will be understood that "demodulating" is typically a process of downconverting and despreading a received signal, and "decoding" the downconverted and despread received signal is a process that can involve, for example, a Turbo decoder or another type of decoder.

It will be appreciated that the threshold value is chosen such that if it is highly likely that the received signal or channel contains nothing of interest, no further demodulation and no decoding are performed. To put it another way, the received signal is further demodulated and decoded only if it is not empty. To put it yet another way, continue demodulating the received signal followed by decoding it if the SIR estimate over the first few slots is large enough. Of course, the threshold value is suitably chosen to yield an acceptable false-detection/missed-detection rate, e.g., about 0.1%. The threshold value can be determined as a function of the Doppler frequency spread or power delay spread of the wireless channel, or the inter-cell (other-cell) interference and noise. For example, it is currently believed that the threshold value can be higher for a higher power delay spread as then the inter-symbol interference would be higher. It will be understood that the power delay spread is generally based on the first and last paths in the path delay profile, which can be determined in many ways, as described in U.S. Patent Application Publication No. US 2009/0059871 A1 by Nader et al. for "Time-to-Trigger Handling Methods and Apparatus". A look-up table can be implemented for a discrete number of values of such parameters and map to a corresponding threshold value.

Generating SIR estimates can often be done in many ways, and typical methods in a WCDMA communication system are carried out on the common pilot channel (CPICH). A suitable SIR estimate can usually be generated by averaging together estimates in a small number, e.g., 3-5, of time slots. It will be appreciated that smoothing the SIR estimate by averaging is usually desirable in a practical receiver, but it can be considered optional.

The example of a method of controlling a receiver for the S-CCPCH depicted in FIG. 3B includes demodulating (step 302-1) a selected first portion of a received S-CCPCH signal, and then using a modified CPICH SIR estimation method to generate a SIR estimate based on the demodulated first portion of the received signal.

A WCDMA receiver typically includes a RAKE combiner that is configured to selectively combine received echoes of the signal transmitted by a BS. The SIR estimate of the S-CCPCH is based on a data set $C_{data}$ that is obtained from such a RAKE combiner or equivalent device, which is indicated in FIG. 3B by the step 304-1.

The RAKE data set $C_{data}$ is related to the (unweighted) impulse response of the S-CCPCH according to the following expression:

$$C_{data} = c \sum_{f=1}^{F} \frac{h_f^{S\text{-}CCPCH}(h_f^{CPICH})^*}{I_f} \qquad \text{Eq. 1}$$

in which c is a scaling constant that depends on the SF of the S-CCPCH, f is an index of the total RAKE fingers F that are combined, $I_f$ is the interference from RAKE finger f, $h_f^{S\text{-}CCPCH}$ is a channel estimate of the S-CCPCH for RAKE finger f, $h_f^{CPICH}$ is a channel estimate of the CPICH for RAKE finger f, and * indicates complex conjugate.

The RAKE data set $C_{data}$ can be modified to yield an estimate of the SIR on the S-CCPCH because, by definition, the SIR on the S-CCPCH is given by the following summation:

$$\sum_{f=1}^{F} \frac{|h_f^{S\text{-}CCPH}|^2}{I_f} \qquad \text{Eq. 2}$$

in which the parameters are as defined above, and so substituting Eq. 2 into Eq. 1 and re-arranging yields the following expression:

$$SIR_{sample}^{S\text{-}CCPCH} = \frac{256}{SF} \left( \frac{C_{data}}{c\sqrt{SIR^{CPICH}}} \right)^2 = A \frac{(C_{data})^2}{SIR^{CPICH}} \qquad \text{Eq. 3}$$

in which $SIR_{sample}^{S\text{-}CCPCH}$ is the SIR on the S-CCPCH for one sample; $SIR^{CPICH}$ is the SIR on the CPICH; A is a factor that scales the interference so that it reflects a transport channel with a spreading factor SF (which in this case is the SF of the S-CCPCH); and the other parameters are as described above. It will be understood that the "sample" in Eq. 3 is the SIR of the S-CCPCH estimated or computed based on one slot.

The $SIR^{CPICH}$ value is part of SIR estimate generation indicated by step 304-2 in FIG. 3B. A WCDMA receiver also typically includes a device or suitably programmed processor circuit for generating channel estimates based on pilot symbols included on the CPICH and other channels.

The scale factors c and A depend on the particulars of the receiver, but can be avoided by implementing the expressions with floating-point computations rather than fixed-point computations. SIR scaling typically involves dividing results of Eq. 3 by the SIR of the CPICH, and if SIR scaling is used in weighted channel estimates, then the $SIR_{sample}^{S-CCPCH}$ is given by the following expression:

$$SIR_{sample}^{S-CCPCH} = \frac{256}{SF}\left(\frac{C_{data}}{c}\right)^2 \qquad \text{Eq. 4}$$

in which the parameters are as defined above. Thus, a S-CCPCH SIR estimate is generated (step 304-3 in FIG. 3B) based on the demodulated first portion of the received signal and the CPICH SIR estimate.

The $SIR_{sample}^{S-CCPCH}$ estimates can optionally be smoothed (filtered) by averaging over $N_{slots}$ (indicated by step 304-4 in FIG. 3B), and the smoothed result may be called $SIR^{S-CCPCH}$.

The method further includes comparing (step 306) the SIR estimate and a threshold value, and at least demodulating (step 308-1) a second or remaining portion of the received signal only if the SIR estimate passes the threshold value (Yes in step 306). If the SIR estimate does not pass the threshold value (No in step 306), which indicates for an S-CCPCH signal that there is no CBS message, the method returns to obtaining RAKE data (step 304-1) and the second portion of the received signal is not further demodulated and need not be decoded, thereby saving the receiver's energy and potentially freeing receiver components for other tasks.

The UE's decision to demodulate and decode the S-CCPCH is based on the SIR estimate of the S-CCPCH $SIR^{S-CCPCH}$ that can be computed according to the preceding exemplary expressions. In particular, the S-CCPCH is decoded if the S-CCPCH SIR estimate exceeds a threshold value $T_{S-CCPCH}$, otherwise it is not decoded. The value of the threshold is UE dependent, but can be selected as the largest value of the threshold such that substantially no CBS transmissions are missed (for example, a missed-detection rate of 0.1% or another value that can be acceptable to the UE's user).

Figure 4:
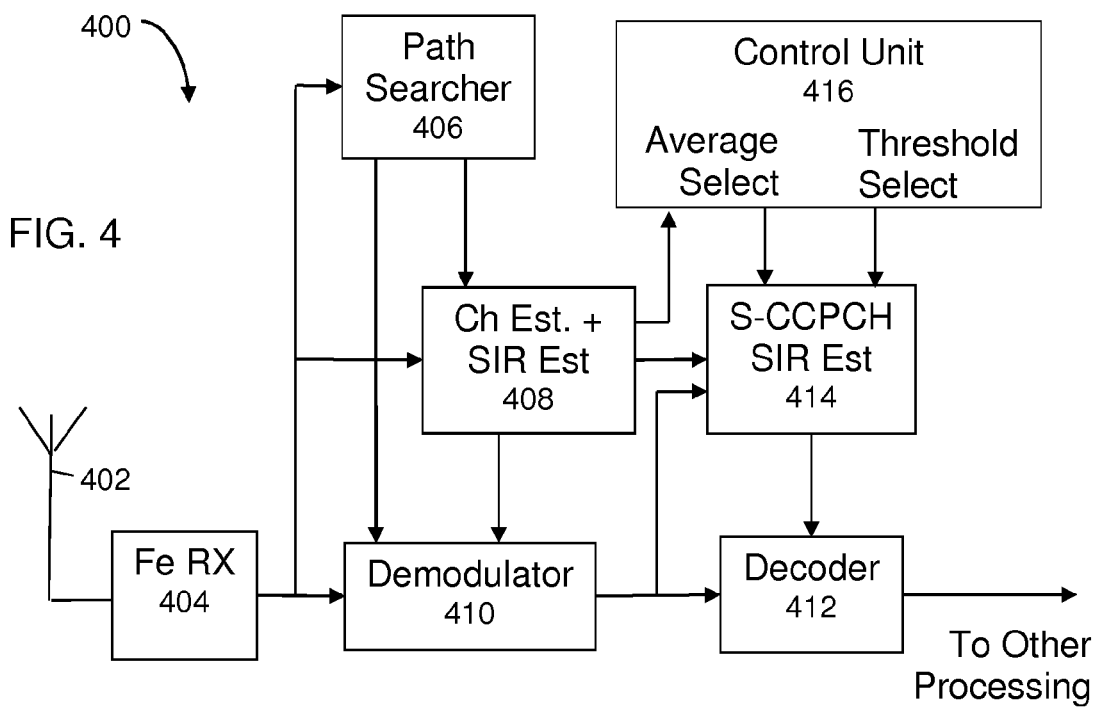
FIG. 4 is a block diagram of a portion of a receiver for a radio communication system.

FIG. 4 is a block diagram of a portion of a UE 400, such as a mobile station in a WCDMA communication system, that can carry out methods such as those described above in accordance with aspects of this invention. A radio signal is received by a suitable antenna or antennas 402 and down-converted and sampled to a baseband signal by a front-end receiver (Fe RX) 404. The samples of the baseband signal are then fed to a path searcher 406 that correlates the received signal samples with known pilot signals and estimates a path delay profile, which is fed to a channel estimator and SIR estimator 408 and to a demodulator 410, which for WCDMA signals includes a RAKE receiver/combiner. The estimators 408 and combiner 410 de-spread the pilot channel CPICH, estimate the impulse response and SIR of the CPICH and other radio channels, and de-spread and combine received echoes of received data and control symbols. Combined echoes of received data symbols are provided to a decoder 412 that provides decoded information to other processing modules in the UE Other blocks in FIG. 4 are described below, and it will be understood that the receiver can be implemented by other arrangements of the functional blocks shown in FIG. 4. For example, the path searcher 406 can include a RAKE combiner, and so a hardware or software RAKE processing block could be shared by the searcher 406 and demodulator 410. Alternatively, separate RAKE processors for the searcher 406 and demodulator 410 can be implemented.

Channel estimation, RAKE combining, and pilot channel SIR estimation are well known in the art. Channel estimation is described in, for example, U.S. Patent Application Publication No. 2005/0105647 by Wilhelmsson et al. for "Channel Estimation by Adaptive Interpolation". Aspects of RAKE receivers are described in U.S. Pat. No. 5,305,349 to Dent for "Quantized Coherent Rake Receiver"; No. 6,363,104 to Bottomley for "Method and Apparatus for Interference Cancellation in a Rake Receiver"; and No. 6,801,565 to Wang et al. for "Multi-Stage Rake Combining Methods and Apparatus"; and U.S. Patent Application Publication No. 2001/0028677 by Wang et al. for "Apparatus and Methods for Finger Delay Selection in Rake Receivers". Aspects of SIR estimation are described in, for example, U.S. Pat. No. 7,555,074 to Lindoff et al. for "Interference Estimation in the Presence of Frequency Errors". For example, the estimator 408 can generate a CPICH SIR estimate once per slot based on estimates of the signal power and interference of the slot derived from the pilot symbols.

As depicted by FIG. 4, the estimators 408 and demodulator/RAKE 410 provide RAKE data sets $C_{data}$ and CPICH SIR estimates to a S-CCPCH estimator 414, which computes estimates of the SIR on the S-CCPCH as described above. The estimator 414 averages a selected number of sample estimates and compares the averaged S-CCPCH SIR estimates to a selectable threshold $T_{S-CCPCH}$, and based on the comparison, the estimator 414 signals the decoder 412 to decode or not. The estimator 414 can determine the average as a moving average of the last number of samples as in the simulation described below, but it will be understood that other averages can be used. It will also be understood that as an alternative, the SIR estimates can be provided to the decoder 412, which can implement averaging and compare the estimates to the threshold. It may be noted that the threshold, like the SIR, is a ratio and so is dimensionless (or equivalently has units of dB).

The selected number of sample estimates to average and threshold value can be determined or provided to the estimator 414 by a control unit 416, which can be a suitably programmed electronic processor. The control unit 416 can determine the threshold value based on a suitable function of the Doppler frequency spread or power delay spread of the wireless channel, or the inter-cell (other-cell) interference and noise, as estimated by the channel and SIR estimator 408 and other components. Such a suitable function can be determined by experience, and can be either computed or stored in a memory in or accessed by the control unit 416 as a suitable look-up table. As an alternative, the threshold value can be predetermined and stored in the memory. In a similar way, the number of samples to average can be predetermined or determined by experience.

It will be appreciated that procedures described above are carried out repetitively as necessary, for example, to respond to the time-varying nature of communication channels between transmitters and receivers. In addition, this description is written in terms of channels such as the S-CCPCH and CPICH, but it will be understood that other channels may also be suitable.

Figure 5:
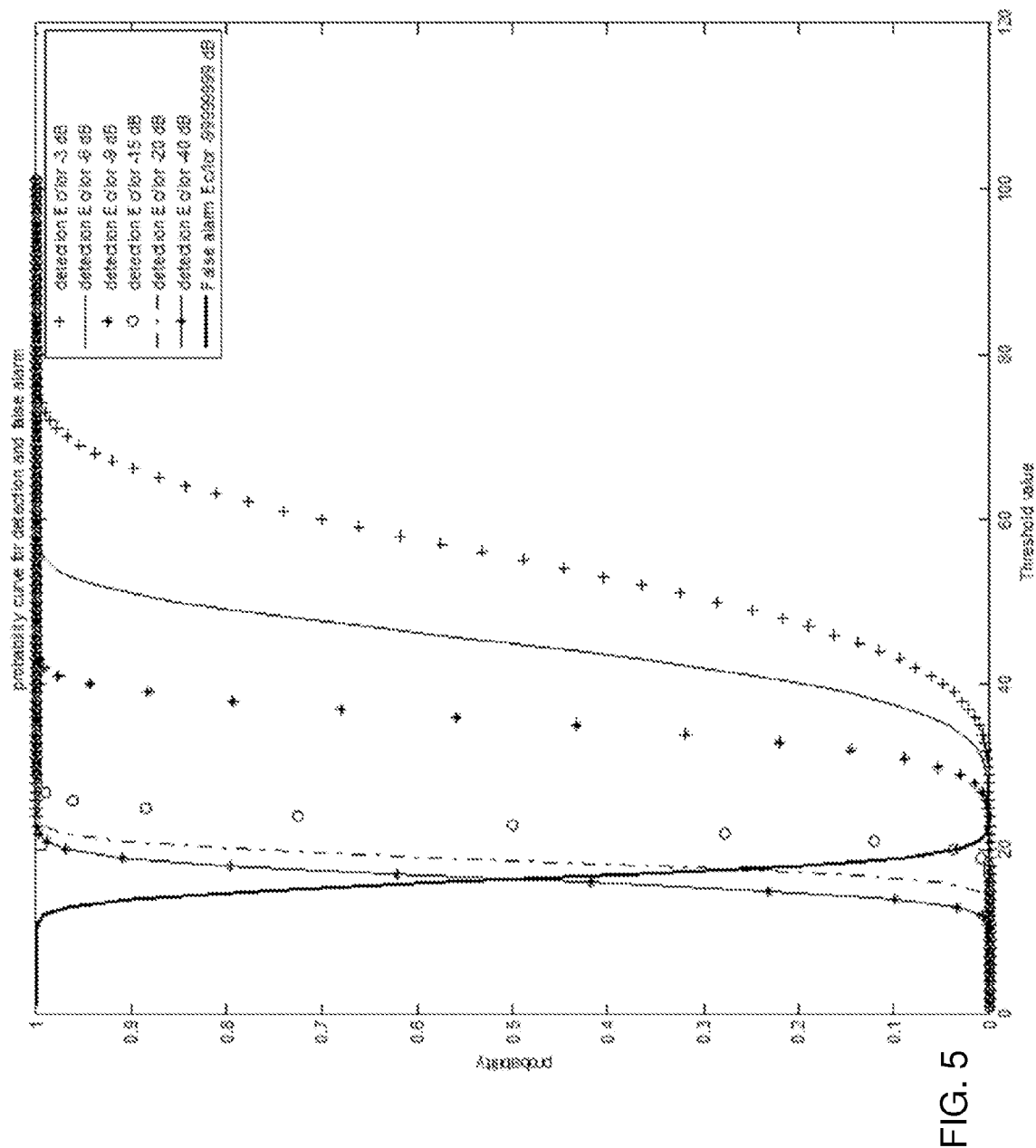
FIG. 5 is a plot of simulation results.

A computer simulation of a UE including the receiver control methods has been carried out, and based on the simulation results, it is currently believed that smoothing over five slots (i.e., $N_{slots}$=5) with a threshold $T_{S-CCPCH}$=18 (or equivalently 12.6 dB) to provides a high CBS detection rate and power saving at the UE as well as a low false-alarm rate. The simulation involved 2000 simulated frames, with additive white Gaussian noise and the following physical-channel power levels in terms of the ratio of energy per chip to receiver interference level Ec/Ior:

P-CCPCH: −12 dB
PICH: −15 dB
Synchronization channel: −12 dB
CPICH: −10 dB
S-CCPCH: −3, −6, −9, −15, −20, −40, and −99999999 dB FIG. 5 is a plot of probability value against threshold value for simulations iterated through the Ec/Ior values of S-CCPCH with power settings for other channels maintained at the given level. In the figure, one curve depicts the probability of false alarm for S-CCPCH Ec/Ior=−99999999 dB, which drops from substantially unity for threshold values less than about 10 to substantially zero for threshold values greater than about 30 (14.8 dB). The other curves in the figure depict the probability of detection. For example, for S-CCPCH Ec/Ior=−40 dB, the probability of detection increases from substantially zero for threshold values less than about 11 (10.4 dB) to substantially unity for threshold values greater than about 25 (14.0 dB).

Thus, it can be seen that the methods described above can save power in UEs, needing to receive only about five slots to estimate the SIR on the S-CCPCH and decide whether further S-CCPCH processing is needed. Full demodulation of the S-CCPCH, assuming the smallest transmission time interval of 10 ms and including decoding time, requires about 20 slots. Thus, methods and apparatus as described above can enjoy a power consumption reduction of about 75% even in worst-case scenarios, in which the PICH frequently notifies the UE that there may be a CBS message.

It will be appreciated that many of the several blocks of the UE depicted in FIG. 4 can be implemented by one or more suitably programmed electronic processors, collections of logic gates, etc. that processes information stored in one or more memories. The stored information can include program instructions and data that enable the blocks to implement the methods described above. It will be appreciated that the UE typically includes timers, etc. that facilitate its operations.

It will be appreciated that procedures described above are carried out repetitively as necessary, for example, to respond to the time-varying nature of communication channels between transmitters and receivers. It will also be appreciated that the methods and devices described above can be combined and re-arranged in a variety of equivalent ways, and that the methods can be performed by one or more suitably programmed or configured digital signal processor circuits and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the appended claims.

What is claimed is:

1. A method of controlling a receiver based on a received signal, comprising:
   demodulating a first portion of the received signal;
   generating, based on a demodulated first portion of the signal, an estimate of signal to interference ratio (SIR);
   comparing the SIR estimate and a threshold value; and
   at least demodulating a second portion of the signal only if the SIR estimate passes the threshold value;
   wherein generating the SIR estimate includes combining a plurality of received signal echoes and a received reference channel signal, and generating a second SIR estimate of the received reference channel signal, and the SIR estimate is based on the second SIR estimate and a combination of the plurality of received signal echoes.

2. The method of claim 1, wherein the threshold value corresponds to a maximum allowed missed-detection rate of information carried by the received signal.

3. The method of claim 2, wherein the threshold value is based on at least one of a Doppler frequency spread of the received signal, a power delay spread of the received signal channel, and inter-cell (other-cell) interference and noise.

4. The method of claim 1, wherein the received signal is a secondary common control physical channel signal configured to carry cell broadcast short message service information.

5. The method of claim 1, wherein the first portion of the received signal comprises a selected number of time slots.

6. The method of claim 1, wherein the SIR estimate is generated according to:

$$SIR_{sample}^{S-CCPCH} = A \frac{(C_{data})^2}{SIR^{CPICH}}$$

in which $SIR_{sample}^{S-CCPCH}$ represents a SIR estimate based on a time slot of the first portion of the received signal, A represents a scaling constant, $C_{data}$ represents a combination of the plurality of received signal echoes, and $SIR^{CPICH}$ represents the second SIR estimate.

7. An apparatus in a receiver for controlling the receiver based on a received signal, comprising:
   a demodulator configured to demodulate at least a first portion of the received signal;
   an estimator configured to generate, based on a demodulated first portion of the received signal, a signal-to-interference ratio (SIR) estimate; and
   a comparator configured to compare the SIR estimate and a threshold value;
   wherein the demodulator is further configured to demodulate a second portion of the received signal only if the SIR estimate passes the threshold value; and the estimator is configured to generate the SIR estimate based on a combination of a plurality of received signal echoes and a received reference channel signal, and on a second SIR estimate of the received reference channel signal.

8. The apparatus of claim 7, wherein the threshold value corresponds to a maximum allowed missed-detection rate of information carried by the received signal.

9. The apparatus of claim 8, wherein the threshold value is generated by a control unit based on at least one of a Doppler frequency spread of the received signal, a power delay spread of the received signal channel, and inter-cell (other-cell) interference and noise.

10. The apparatus of claim 7, wherein the received signal is a secondary common control physical channel signal that is configured to carry cell broadcast short message service information.

11. The apparatus of claim 7, wherein the first portion of the received signal comprises a selected number of time slots.

12. The apparatus of claim 1 wherein the estimator is configured to generate the SIR estimate according to:

$$SIR_{sample}^{S-CCPCH} = A\frac{(C_{data})^2}{SIR^{CPICH}}$$

in which $SIR_{sample}^{S-CCPCH}$ represents a SIR estimate based on a time slot of the first portion of the received signal, A represents a scaling constant, $C_{data}$ represents the combination of the plurality of received signal echoes, and $SIR^{CPICH}$ represents the second SIR estimate.

13. A non-transitory computer-readable medium having stored instructions that, when executed by a computer, cause the computer to carry out a method of controlling a receiver based on a received signal, wherein the method comprises:
   demodulating a first portion of the received signal;
   generating, based on a demodulated first portion of the received signal, an estimate of signal to interference ratio (SIR);
   comparing the SIR estimate and a threshold value; and
   at least demodulating a second portion of the signal only if the SIR estimate passes the threshold value;
   wherein generating the SIR estimate includes combining a plurality of received signal echoes and a received reference channel signal, and generating a second SIR estimate of the received reference channel signal, and the SIR estimate is based on the second SIR estimate and a combination of the plurality of received signal echoes.

14. The non-transitory medium of claim 13, wherein the threshold value corresponds to a maximum allowed missed-detection rate of information carried by the received signal.

15. The non-transitory medium of claim 14, wherein the threshold value is based on at least one of a Doppler frequency spread of the received signal, a power delay spread of the received signal channel, and inter-cell (other-cell) interference and noise.

16. The non-transitory medium of claim 13, wherein the received signal is a secondary common control physical channel signal that is configured to carry cell broadcast short message service information.

17. The non-transitory medium of claim 13, wherein the first portion of the received signal comprises a selected number of time slots.

18. The non-transitory medium of claim 13, wherein the SIR estimate is generated according to:

$$SIR_{sample}^{S-CCPICH} = A\frac{(C_{data})^2}{SIR^{CPICH}}$$

in which $SIR_{sample}^{S-CCPCH}$ represents a SIR estimate based on a time slot of the first portion of the received signal, A represents a scaling constant, $C_{data}$ represents a combination of the plurality of received signal echoes, and $SIR^{CPICH}$ represents the second SIR estimate.

* * * * *

UNITED STATES PATENT AND TRADEMARK OFFICE
CERTIFICATE OF CORRECTION

PATENT NO. : 8,520,782 B2  
APPLICATION NO. : 12/971021  
DATED : August 27, 2013  
INVENTOR(S) : Jonsson et al.

Page 1 of 1

It is certified that error appears in the above-identified patent and that said Letters Patent is hereby corrected as shown below:

On the Title Page, item (51), under "Int. Cl.", in Column 1, Line 1,
delete "H01L 27/06 (2006.01)" and insert -- H04L 27/06 (2006.01) --, therefor.

In the Specification:

In Column 6, Line 40, delete " $\sum_{f=1}^{F} \frac{|h_f^{S-CCPH}|^2}{I_f}$ " and insert -- $\sum_{f=1}^{F} \frac{|h_f^{S-CCPCH}|^2}{I_f}$ --, therefor.

In the Claims:

In Column 11, Line 17, in Claim 12, delete "1" and insert -- 1, --, therefor.

In Column 12, Line 29, in Claim 18, delete " $SIR_{sample}^{S-CCPICH} = A \frac{(C_{data})^2}{SIR^{CPICH}}$ " and insert -- $SIR_{sample}^{S-CCPCH} = A \frac{(C_{data})^2}{SIR^{CPICH}}$ --, therefor.

Signed and Sealed this  
Eighth Day of July, 2014

Michelle K. Lee  
*Deputy Director of the United States Patent and Trademark Office*